United States Patent [19]
Kelleher et al.

[11] Patent Number: 6,088,043
[45] Date of Patent: Jul. 11, 2000

[54] SCALABLE GRAPHICS PROCESSOR ARCHITECTURE

[75] Inventors: Brian M. Kelleher, Palo Alto; Thomas E. Dewey, Redwood City, both of Calif.

[73] Assignee: 3D Labs, Inc., United Kingdom

[21] Appl. No.: 09/070,162

[22] Filed: Apr. 30, 1998

[51] Int. Cl.[7] .................................................. G06F 15/16
[52] U.S. Cl. .......................... 345/502; 345/520; 710/131
[58] Field of Search .......................... 345/502, 519–520, 345/505; 710/126–129, 131, 132

[56] References Cited

U.S. PATENT DOCUMENTS

| | | | |
|---|---|---|---|
| 5,630,101 | 5/1997 | Sieffert | 395/500 |
| 5,640,543 | 6/1997 | Farrell et al. | 395/502 |
| 5,706,290 | 1/1998 | Shaw et al. | 370/465 |
| 5,712,664 | 1/1998 | Reddy | 345/516 |
| 5,956,046 | 9/1999 | Kehlet et al. | 345/502 |
| 5,995,121 | 11/1999 | Alcorn et al. | 345/520 |
| 6,008,821 | 12/1999 | Bright et al. | 345/504 |

*Primary Examiner*—Kee M. Tung
*Attorney, Agent, or Firm*—Sawyer Law Group LLP

[57] ABSTRACT

A scalable graphics processor architecture is disclosed in accordance with the present invention. In a first aspect, the architecture comprises a base graphics architecture. The architecture further includes an expansion graphic architecture, the expansion graphics architecture being mateably coupled to the base graphics architecture. In a second aspect, the architecture comprises a plurality of rendering processors, a first bus coupled to the plurality of processors for providing I/O signals to the processors; and a plurality of digital to analog converters (VDACs). In this aspect, each of the VDACs are adapted for driving a display. The architecture further includes a second bus coupled between the plurality of rendering processors and the plurality of VDACs for providing image data therebetween; and a switch, coupled to a plurality of processors. The switch selectively drives the rendering processors such that one of the plurality of the VDACs are driven by all of the rendering processors when the switch is in a first mode and the rendering processors drive all of the plurality of VDACs when the switch is in a second mode. Through the use of this architecture, the graphics processor system is expandable to allow more rendering processors to be added as well as allowing the processors to drive multiple VDACs or drive a single VDAC together.

20 Claims, 6 Drawing Sheets

SCALABLE GRAPHICS PROCESSOR ARCHITECTURE

FIELD OF THE INVENTION

The present invention relates to computer graphics and more particularly to a processor graphics architecture appropriate for multimedia graphics workstations that is scalable to the needs of a user.

BACKGROUND OF THE INVENTION

The tasks of traditional geometric graphics applications can be partitioned into three functional categories: structure traversal, geometry processing, and rendering. Structure traversal refers to the traversal of an application's graphics data structure, either by the application or by a graphics library.

Geometry processing refers to floating point intensive operations, such as vertex transformation and shading, that convert the image data from an applications format into a geometric format of vertices comprising the image and vertex properties, such as color. Finally, rendering refers to the process of calculating individual pixel values for the image that are stored in graphics memory based on the transformed geometric data.

Graphics accelerator cards are used extensively for graphics applications to provide 3D graphics images. Some such cards include parallel processing when rendering. However, known accelerator graphics do not typically have the ability to scale to different size environments. For example, typically a system in which two processors drive one digital analog converter are not upgradable to drive two converters in the event that two displays are desired to be driven at the same time. Conversely, a system in which two processors drive two converters can not be transformed into a system in which both processors drive the same converter. In addition, in known systems there is no way of actually adding more driving capability to the system. Accordingly, what is desired is a system and method for allowing for a scalable graphics architecture. The system should be easy to implement, should be cost-effective, and should be adaptable to existing environments. The present invention addresses such a need.

SUMMARY OF THE INVENTION

A scalable graphics processor architecture is disclosed in accordance with the present invention. In a first aspect, the architecture comprises a base graphics architecture. The architecture further includes an expansion graphic architecture, the expansion graphics architecture being mateably coupled to the base graphics architecture.

In a second aspect, the architecture comprises a plurality of rendering processors, a first bus coupled to the plurality of processors for providing I/O signals to the processors; and a plurality of video digital to analog converters (VDACs). In this aspect, each of the VDACs are adapted for driving a display. The architecture further includes a second bus coupled between the plurality of rendering processors and the plurality of VDACs for providing image data therebetween; and a switch, coupled to a plurality of processors. The switch selectively drives the rendering processors such that one of the plurality of the VDACs are driven by all of the rendering processors when the switch is in a first mode and the rendering processors drive all of the plurality of VDACs when the switch is in a second mode.

Through the use of this architecture, the graphics processor system is expandable to allow more rendering processors to be added as well as allowing the processors to drive multiple VDACs or drive a single VDAC together.

DETAILED DESCRIPTION OF THE INVENTION

The present invention relates to an improvement to a processor graphics architecture. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
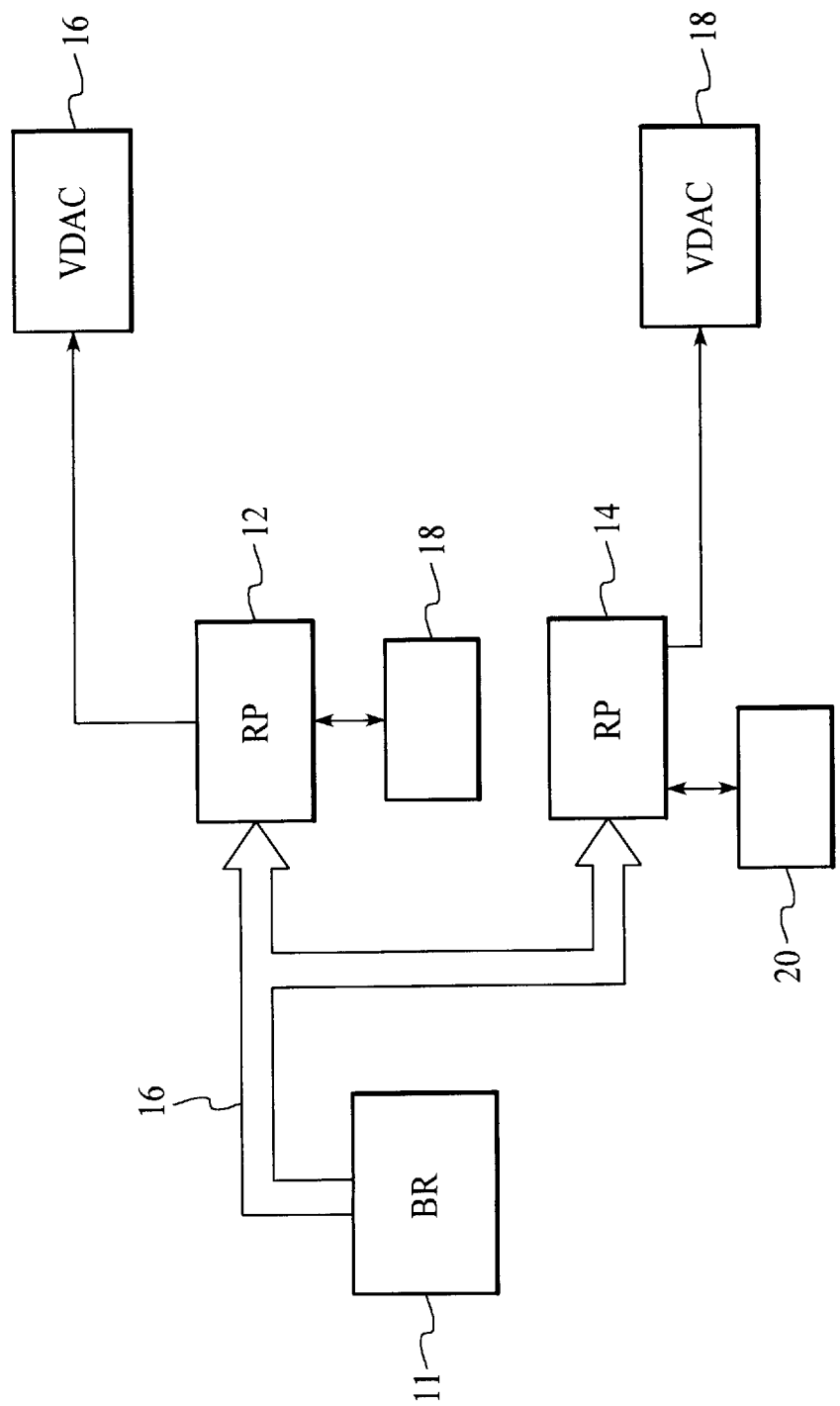
FIG. 1A is a block diagram of a first embodiment conventional graphics architecture.

FIG. 1A is a block diagram of a first embodiment of a conventional graphics architecture 10. The architecture includes two rendering processors 12 and 14, each being provided IO signals through an AGP/PCI Bridge 11 via an 10 bus 16. Each of the rendering processors 12 and 14 has its associated memory 18 and 20. The rendering processors 12 and 14 each drive separate VDACs 16 and 18 respectively which in turn are typically coupled to separate displays (not shown). As is seen, this architecture 10 is not adaptable to expansion or does not allow for two rendering processors to drive one VDAC.

Figure 1B:
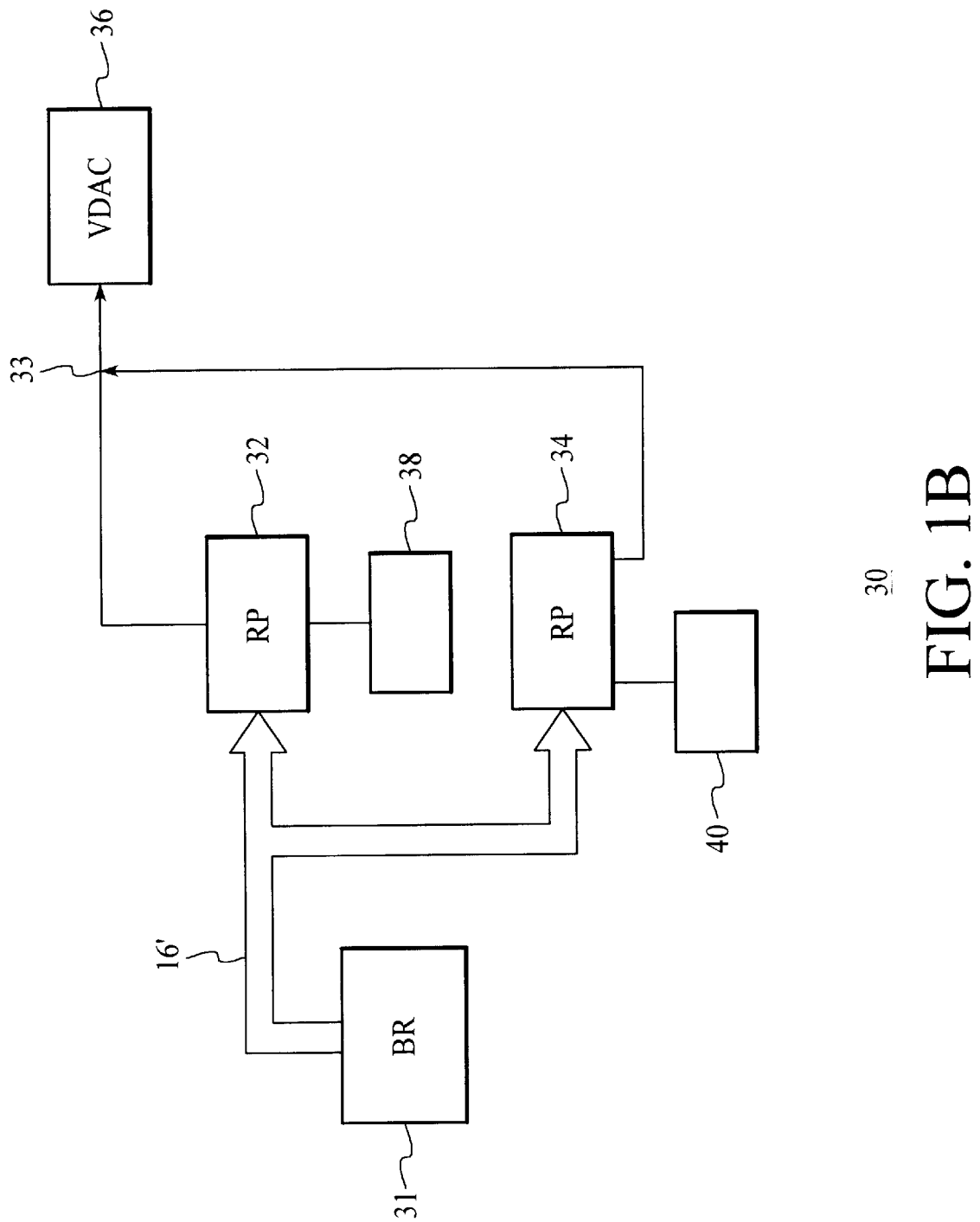
FIG. 1B is a block diagram of a second embodiment conventional graphics architecture.

Referring now to FIG. 1B, what is shown is a second embodiment of a conventional graphics architecture 30. It is very similar to the architecture shown in FIG. 1A, except as is seen, the two rendering processors 32 and 34 both drive the same VDAC 36 via a common connection 33. As is seen, the architecture 30 of FIG. 1B is not convertible to the architecture 10 of FIG. 1A or vice versa. Accordingly, these types of conventional architectures are not expandable and cannot be used in place of each other.

Therefore, if one processor drives each VDAC, then the architecture of FIG. 1A must be used. If, on the other hand, the VDAC is to be driven with multiple rendering processors, then the architecture of FIG. 1B must be used. In addition, if there is a desire to add more driving power, i.e., more processors to either one of the architectures, then it requires a redesign of the particular architecture.

Accordingly, the present invention addresses these problems through the use of a scalable architecture in which additional processors can be adaptably connected to drive either multiple VDACs or a single VDAC in an efficient and reliable manner. To more particularly describe the features and operation of the present invention, refer now to FIG. 2.

Figure 2:
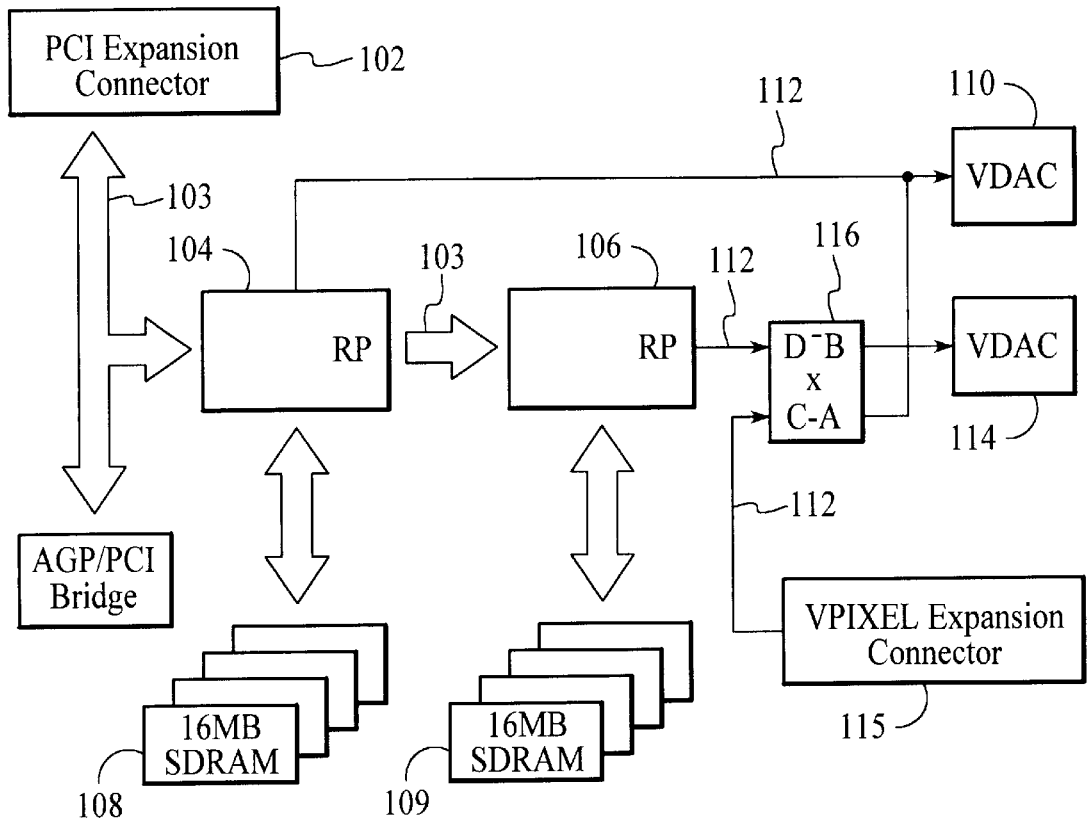
FIG. 2 is a block diagram of a base graphics architecture in accordance with the present invention.

FIG. 2 is a diagram of a base graphics architecture 100 in accordance with the present invention. The base graphics architecture 100 includes a PCI expansion connector 102, which is coupled to an I/O bus 103 such as PCI bus which provides input/output signals to two rendering processors 104 and 106. Rendering processor 104 is coupled to a S-DRAM 108. Rendering processor 106 is coupled to S-DRAM 109. Rendering processor 104 sends image data to a video analog to digital converter (VDAC) 110 via a VDAC bus 112. Rendering processor 106 provides its image data via a crossbar switch 116. Crossbar switch 116 is coupled to VDAC 110 and VDAC 114. As is seen, a Vpixel expansion connector 115 is also coupled to the crossbar switch 116. The crossbar switch 116 in cooperation with the other elements allows for the rendering processors 104 and 106 to each drive the VDAC 110 or together drive both of the VDACs 110 and 114.

Accordingly, in one mode rendering processor 104 drives the VDAC 110 and rendering processor 106 drives VDAC 114 through line D–B of the crossbar switch 116. In a second mode, the first rendering processor 104 drives the VDAC 110 in the manner as has been previously described. However, the second rendering processor 106 drives VDAC 110 via the crossbar switch 116 line C–A.

Figure 3:
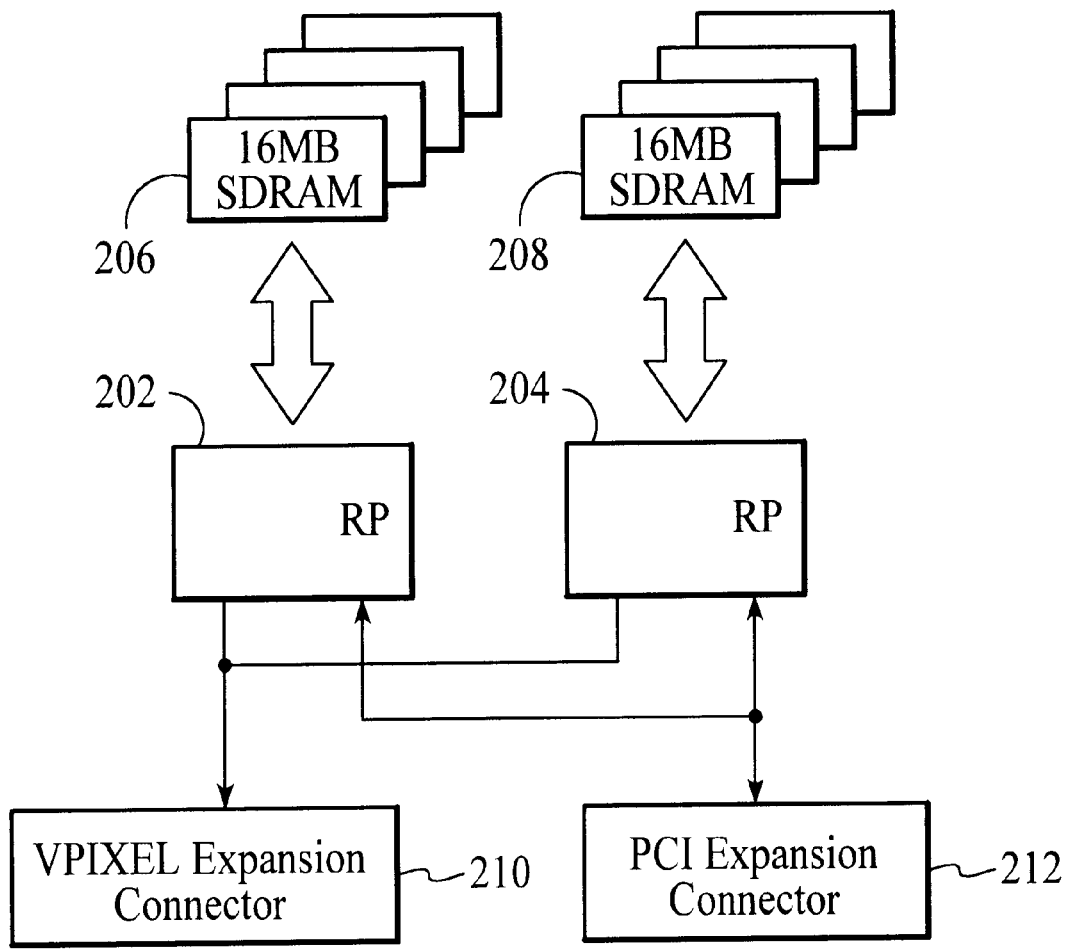
FIG. 3 is a block diagram of an expansion graphics architecture in accordance with the present invention.

Accordingly, in this environment the rendering processors can operate independently from each other or can operate together to either drive both VDACs 110 or 114 or drive one VDAC, that is VDAC 110. Accordingly, through this system a scalable architecture is shown. Furthermore, through the use of the expansion connectors 102 and 115, additional rendering processors can be added to the system. To more fully explain this additional functionability, refer now to FIG. 3, which is a block diagram of an expansion graphics architecture 200 that can be coupled to the base graphics architecture of FIG. 2.

Figure 4:
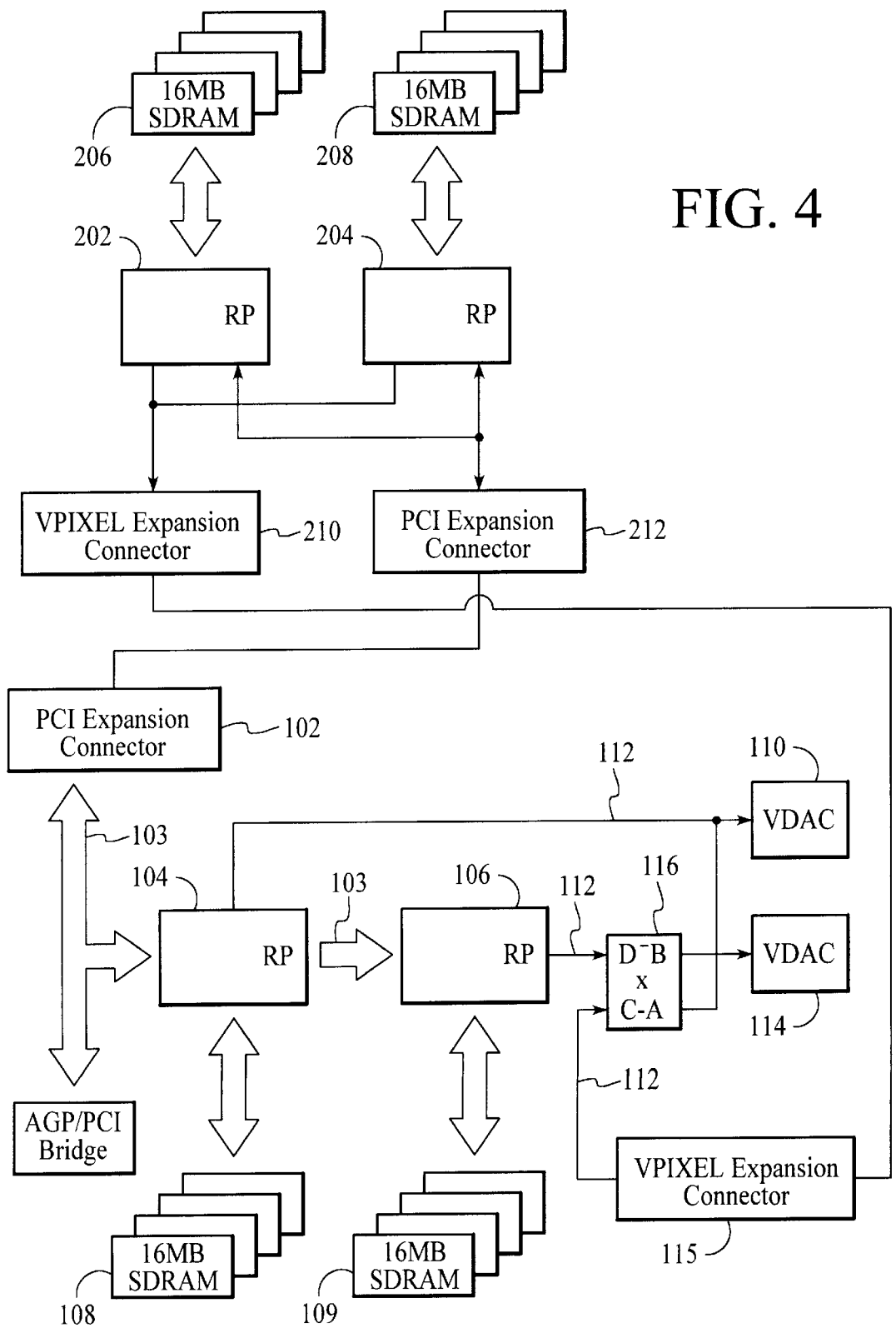
FIG. 4 is a block diagram illustrating the connections of base block of FIG. 2 to the expansion block of FIG. 3.

In a preferred embodiment two rendering processors 202 and 204 are coupled together, as shown with their associated SDRAM memories 206 and 208. The rendering processors 202 and 204 are coupled to a Vpixel expansion connector 210 as well as to the PCI expansion connector 212. These connectors 210 and 212 are in turn mateably connected to Vpixel expansion connector 115 and PCI expansion connector 102, respectively, of the base graphics architecture 100 of FIG. 2. This coupling is illustrated in FIG. 4. Through the mateable engagement of connectors 210 and 212 with connectors 115 and 102, additional rendering processors can be coupled to the base architecture 100 via an expansion architecture 200.

The above-identified embodiment just shows one set of expansion connectors. One of ordinary skill in the art would recognize that a variety of expansion connectors could be provided and their use would be within the spirit and scope of the present invention. The expansion architecture 200 in conjunction with the base architecture 100 allows the rendering processors 104 and 104 together to drive one display via VDAC 110 and the rendering processors 202 and 204 to drive another display via VDAC 114. Then all four rendering processors can be used to drive the VDAC 110. In this mode, rendering processor 104 drives VDAC 110 directly, rendering processors 202 and 204 drive VDAC 10 via the C–A line of the crossbar switch 116 and rendering process 106 drives VDAC 110 via the C–A line of the crossbar switch 116. To more clearly illustrate the timing and how the elements interact to provide for the different modes of driving the VDAC, refer now to FIG. 5.

Figure 5:
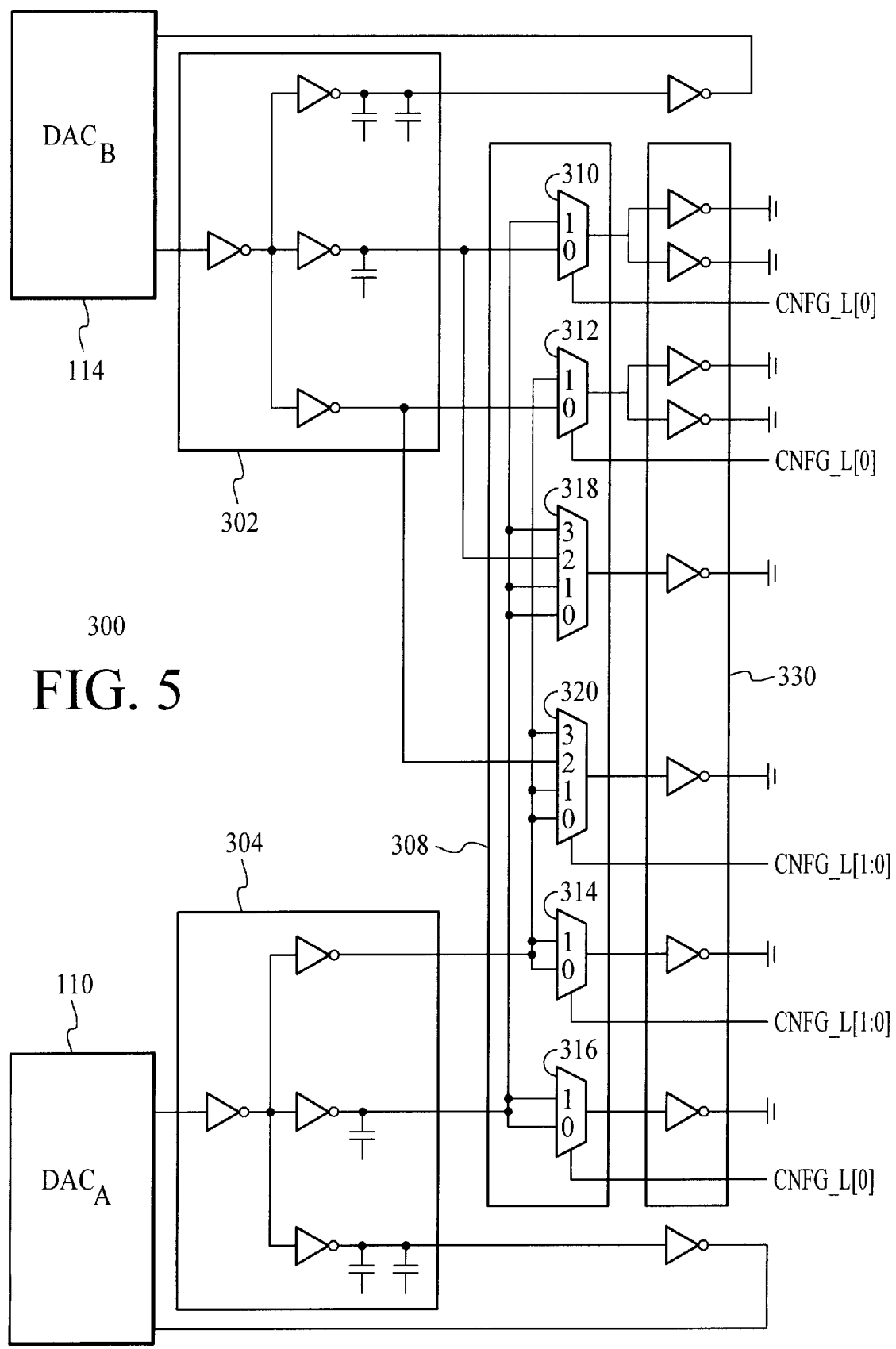
FIG. 5 is a block diagram of a dual domain low skew clock buffer circuit.

FIG. 5 is a block diagram of a dual domain low skew clock buffer circuit. The circuit 300 drives the VDACs 110 and 114 on the left side of the figure and buffering circuitry 302 and 304 and multiplexer circuitry 308 to create the clock to the rendering processors 104, 106, 204 and 206 of FIGS. 2 to 4. The signal being provided to the VDACs 110 and 114 is a load clock signal that is used to clock the data through the rendering processors then back into the VDACs 110 and 114. That clock signal is buffered coming out of the VDACs 110 and 114 and is in a preferred embodiment buffered into three different branches from each VDAC 110 and 114, each of those three branches is just a phase delay, there is an early, a mid, and a late phase delay. The mid phase delay is just a phase delay later than the early delay, and the late is a phase delay later than the mid phase delay. A phase delay later in a preferred embodiment is one nanosecond.

The purpose of first buffer circuitry 302 and 304 is to buffer the signal. The next level of circuitry is a column of multiplexers 308. In this embodiment multiplexers 310, 312, 314 and 316 are 2×1 multiplexers and multiplexers 318 and 320 are 4×1 multiplexers. The purpose of the second buffer circuitry 330 is to rebuffer and strengthen the signal. In this embodiment of the buffer circuit there are four different modes for driving VDACs 110 and 114. The modes are dual two-chip mode, four-chip mode, dual one-chip mode and two-chip mode. What is meant by dual chip mode is that two processors are driving VDAC 110 and two processors are driving VDAC 114. What is meant by four-chip mode is that all four processors are driving the VDAC 110. Dual one-chip mode is without the expansion graphics architecture, where there are only two processors, and each processor is driving a separate VDAC, and two-chip mode is, once again, without the expansion graphics, there are two processors, and both processors are driving a common VDAC, that is VDAC 110. Only the low order bit of the multiplexer selects, (CNFG_L[0]), is used in the 2×1 multiplexers 310–316, and both of the low order bits (CNFG_L[1,0]) are used in the 4×1 multiplexers 318 and 320.

These modes and the bit configurations of a preferred embodiment is listed in Table 1 below.

TABLE 1

| CNFG-L | |
|---|---|
| 11 | 2-chip |
| 10 | Dual 1-chip |
| 01 | 4-chip |
| 00 | Dual 2-chip |

As has been mentioned, this particular system is then utilized through the Vpixel bus to drive the crossbar switch in the manner that allows for one, two or four rendering processors to drive a VDAC as before described.

It should be understood that although the present invention has been described in terms of four rendering processors and the associated clock buffer circuit, one should understand that the circuitry shown can be replicated several times to accommodate as many rendering processors as the graphics architecture requires, the key element being that the number of connectors for the processor increases as the number of processors increases. Accordingly, what has been shown is a system and method for providing a scalable graphics architecture system that is cost-effective, easily implemented, and allows for expandability of an architecture. This is accomplished through the use of connectors for the input-output signals as well as by an expansion connector that allows for driving additional VDACs by the rendering processors.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A scalable graphics processor architecture comprising:
a base graphics architecture; wherein the base graphics architecture further comprises: a plurality of rendering processors; a first bus coupled to the plurality of processors for providing I/O signals to the processors; a first expansion connector coupled to the first bus; a plurality of video digital to analog converters (VDACs), each of the VDACs adapted for driving a display; a second bus coupled between the plurality of rendering processors and the plurality of VDACs for providing image data therebetween;

a switch coupled to the plurality of processors, the switch being for selectively driving the rendering processors such that one of the plurality of the VDACs are driven by all of the rendering processors when the switch is in a first mode and such that the rendering processors drive all of the plurality of VDACs when the switch is in a second mode; and a second expansion connector coupled to the switch for providing image data to at least one of the plurality of digital analog converters; and an expansion graphic architecture, the expansion graphics architecture being mateably coupled to the base graphics architecture.

2. The architecture of claim 1 wherein the expansion architecture comprises:
a plurality of processors;
a third connector coupled to the plurality of processors, the third connector being adapted for mateable engagement with the first connector; and
a fourth connector coupled to the plurality of processors, the fourth connector being adapted for mateable engagement with the second connector.

3. The architecture of claim 2 in which the first bus comprises a PCI bus.

4. The architecture of claim 3 in which the second bus comprises a Vpixel bus.

5. The architecture of claim 4 in which the switch comprises a cross-bar switch.

6. The architecture of claim 5 wherein the switch in a first mode causes each of the plurality of processors to drive an associated one of the plurality of VDACs and in the second mode causes the plurality of processors to drive one of the plurality of VDACs.

7. The architecture of claim 6 in which the first and third expansion connectors comprise PCI expansion connectors.

8. The architecture of claim 7 in which the second and fourth expansion connectors comprise Vpixel expansion connector.

9. A scalable graphics processor architecture comprising:
a plurality of rendering processors;
a first bus coupled to the plurality of processors for providing I/O signals to the processors;
a plurality of video digital to analog converters (VDACs), each of the VDACs adapted for driving a display;
a second bus coupled between the plurality of rendering processors and the plurality of VDACs for providing image data therebetween; and
a switch, coupled to plurality of processors, the switch being for selectively driving the rendering processors such that one of the plurality of the VDACs are driven by all of the rendering processors when the switch is in a first mode and such that the rendering processors drive all of the plurality of VDACs when the switch is in a second mode.

10. The architecture of claim 9 in which the first bus comprises a PCI bus.

11. The architecture of claim 10 in which the second bus comprises a Vpixel bus.

12. The architecture of claim 11 in which the switch comprises a cross-bar switch.

13. The architecture of claim 12 wherein the switch in a first mode causes each of the plurality of processors to drive an associated one of the plurality of VDACs and in the second mode causes the plurality of processors to drive one of the plurality of VDACs.

14. A scalable graphics processor architecture comprising:
a plurality of rendering processors;
a first bus coupled to the plurality of processors for providing I/O signals to the processors;
a first expansion connector coupled to the first bus;
a plurality of video digital to analog converters (VDACs), each of the VDACs adapted for driving a display;
a second bus coupled between the plurality of rendering processors and the plurality of VDACs for providing image data therebetween;
a switch, coupled to plurality of processors, the switch being for selectively driving the rendering processors such that one of the plurality of the VDACs are driven by all of the rendering processors when the switch is in a first mode and such that the rendering processors drive all of the plurality of VDACs when the switch is in a second mode; and
a second expansion connector coupled to the switch for providing image data to at least one of the plurality of digital analog converters.

15. The architecture of claim 14 in which the first bus comprises a PCI bus.

16. The architecture of claim 15 in which the second bus comprises a Vpixel bus.

17. The architecture of claim 16 in which the switch comprises a cross-bar switch.

18. The architecture of claim 17 wherein the switch in a first mode causes each of the plurality of processors to drive an associated one of the plurality of VDACs and in the second mode causes the plurality of processors to drive one of the plurality of VDACs.

19. The architecture of claim 18 in which the first expansion connector comprises a PCI expansion connector.

20. The architecture of claim 19 in which the second expansion connector comprises a Vpixel expansion connector.

* * * * *